United States Patent
Iwasa

(10) Patent No.: US 10,518,492 B2
(45) Date of Patent: Dec. 31, 2019

(54) METHOD FOR MANUFACTURING RUBBER CRAWLER

(71) Applicant: BRIDGESTONE CORPORATION, Chuo-ku, Tokyo (JP)

(72) Inventor: Mitsuhiro Iwasa, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/577,892

(22) PCT Filed: May 30, 2016

(86) PCT No.: PCT/JP2016/002616
§ 371 (c)(1),
(2) Date: Nov. 29, 2017

(87) PCT Pub. No.: WO2016/208124
PCT Pub. Date: Dec. 29, 2016

(65) Prior Publication Data
US 2018/0290410 A1    Oct. 11, 2018

(30) Foreign Application Priority Data
Jun. 24, 2015    (JP) .................... 2015-126659

(51) Int. Cl.
*B29D 29/00* (2006.01)
*B29C 35/02* (2006.01)
*B62D 55/24* (2006.01)

(52) U.S. Cl.
CPC .............. *B29D 29/00* (2013.01); *B29C 35/02* (2013.01); *B62D 55/24* (2013.01)

(58) Field of Classification Search
CPC ........ B29D 29/00; B29D 29/08; B62D 55/24; B62D 55/253; B29C 35/02; B29C 65/70;
(Continued)

(56) References Cited

U.S. PATENT DOCUMENTS 4,390,214 A * 6/1983 Gunter ................... B62D 55/28
152/211
2003/0141630 A1 7/2003 Fujita
(Continued)

FOREIGN PATENT DOCUMENTS

CN    1469799 A    1/2004
JP    H02261629 A    10/1990
(Continued)

OTHER PUBLICATIONS

Machine translation JP 11-129354 date unknown.*
(Continued)

*Primary Examiner* — John L Goff, II
(74) *Attorney, Agent, or Firm* — Kenja IP Law PC

(57) ABSTRACT

Provided is a method for producing a rubber crawler capable of suppressing deformation of tension members which probably occurs during the manufacture. The method for producing a rubber crawler 1 comprises: obtaining rubber protrusions 4, 5 having half-vulcanized surfaces 4a, 5a by vulcanizing an unvulcanized rubber RR while keeping a half-vulcanized state; obtaining a main body 2 having half-vulcanized surfaces 2c, 2d by vulcanizing an unvulcanized rubber RR with tension members 3 embedded therein while keeping a half-vulcanized state; and arranging the rubber protrusions 4, 5 on the main body 2, and then integrating the rubber protrusions 4, 5 and the main body 2 by vulcanizing the same.

6 Claims, 6 Drawing Sheets

(58) Field of Classification Search
CPC .......... Y10T 156/1089; Y10T 156/109; Y10T 156/1092
USPC .................... 156/308.2–309.9, 137–142
See application file for complete search history.

(56) References Cited

U.S. PATENT DOCUMENTS

| | | | |
|---|---|---|---|
| 2003/0168777 A1* | 9/2003 | Fujita | B29C 35/02 264/326 |
| 2004/0058767 A1 | 3/2004 | Hara et al. | |
| 2010/0124659 A1* | 5/2010 | Nelson | B29C 35/0266 428/411.1 |

FOREIGN PATENT DOCUMENTS

| | | |
|---|---|---|
| JP | H09277968 A | 10/1997 |
| JP | H11129354 A | 5/1999 |
| JP | 2002120231 A | 4/2002 |
| JP | 2003340934 A | 12/2003 |
| JP | 2004034352 A | 2/2004 |
| JP | 2004076927 A | 3/2004 |
| JP | 2004082702 A | 3/2004 |
| JP | 2004114555 A | 4/2004 |
| JP | 2004251402 A | 9/2004 |
| JP | 2004316787 A | 11/2004 |
| JP | 2005280337 A | 10/2005 |
| JP | 2006007450 A | 1/2006 |
| JP | 2006009946 A | 1/2006 |
| JP | 2008044151 A | 2/2008 |
| JP | 2008100365 A | 5/2008 |
| JP | 2008183835 A | 8/2008 |
| JP | 2008213144 A | 9/2008 |
| JP | 2008213145 A | 9/2008 |
| JP | 2008213452 A | 9/2008 |
| JP | 2008265031 A | 11/2008 |
| JP | 2009196135 A | 9/2009 |
| JP | 2012101411 A | 5/2012 |
| JP | 2012228825 A | 11/2012 |
| JP | 2014095452 A | 5/2014 |

OTHER PUBLICATIONS

Machine translation JP 02-261629 date unknown.*
Aug. 9, 2016, International Search Report issued in the International Patent Application No. PCT/JP2016/002616.
Apr. 16, 2019, search result of Office Action issued by the State Intellectual Property Office in the corresponding Chinese Patent Application No. 201680036206.7.

* cited by examiner

METHOD FOR MANUFACTURING RUBBER CRAWLER

TECHNICAL FIELD

This disclosure relates to a method for manufacturing a rubber crawler.

BACKGROUND

In a conventional method for manufacturing a rubber crawler, an unvulcanized rubber of a predetermined length is disposed additionally on an inner circumferential side and an outer circumferential side of tension members, and these are clamped with an upper mold piece and a lower mold piece and subjected to vulcanization molding, to thereby obtain a belt-like rubber crawler. Then, an unvulcanized longitudinal end of the rubber crawler is integrally subjected to vulcanization adhesion, to thereby obtain a cyclic rubber crawler (see, e.g., JP2005-280337A (PTL1)).

CITATION LIST

Patent Literature

PTL1: JP2005-280337A

SUMMARY

Technical Problem

In the aforementioned conventional method for manufacturing a rubber crawler, by closing a mold with an unvulcanized rubber (crude rubber) including a part formed into rubber protrusions (e.g., driving protrusions and lugs) arranged therein, the rubber protrusions and the main body are integrally shaped at an unvulcanized state, and then, by applying pressure and heat to this unvulcanized rubber, a vulcanized rubber crawler is formed, while at this time, the unvulcanized rubber is fluid. A fluid rubber flows from a high-pressure part to a low-pressure part. The low-pressure part is mainly thick parts of the rubber crawler, i.e., recesses inside the mold at which the unvulcanized rubber is arranged to shape the rubber protrusions. Therefore, when closing unvulcanized rubber inside the mold to integrally obtain the rubber crawler, fluid rubber flows toward the recesses inside the mold at which the rubber protrusions are to be shaped.

If the tension members are pushed to the rubber flowing in this way, there is a risk of deformation of the tension members.

This disclosure aims to provide a method for producing a rubber crawler capable of suppressing deformation of the tension members which probably occurs during the manufacture.

Solution to Problem

The method for producing a rubber crawler according to this disclosure comprises: forming rubber protrusions having a half-vulcanized surface by vulcanizing an unvulcanized rubber while keeping a part of its surface in a half-vulcanized state; forming a main body having a half-vulcanized surface by vulcanizing an unvulcanized rubber with tension members embedded therein while keeping at least planned arranging positions at which the rubber protrusions are to be arranged in a half-vulcanized state; and forming a rubber crawler by, after the forming of the rubber protrusions and the forming of the main body, arranging the rubber protrusions on the main body so that the half-vulcanized surface of the rubber protrusions matches the half-vulcanized surface of the main body, and then integrating the rubber protrusions and the main body via vulcanization. According to the method for producing a rubber crawler according to this disclosure, it is possible to suppress deformation of the tension members which probably occurs during the manufacture.

In the method for producing a rubber crawler according to this disclosure, it is preferable that in the forming of the rubber crawler, the rubber protrusions and the main body are vulcanized in a space controllable at high temperature and high pressure. In this case, a mold for integrating the rubber protrusions and the main body is unnecessary.

Advantageous Effect

According to this disclosure, it is possible to provide a method for producing a rubber crawler capable of suppressing deformation of the tension members which probably occurs during the manufacture.

DETAILED DESCRIPTION

In the following, various embodiments of the method for producing a rubber crawler according to this disclosure are described in details with reference to the drawings.

Figure 1:
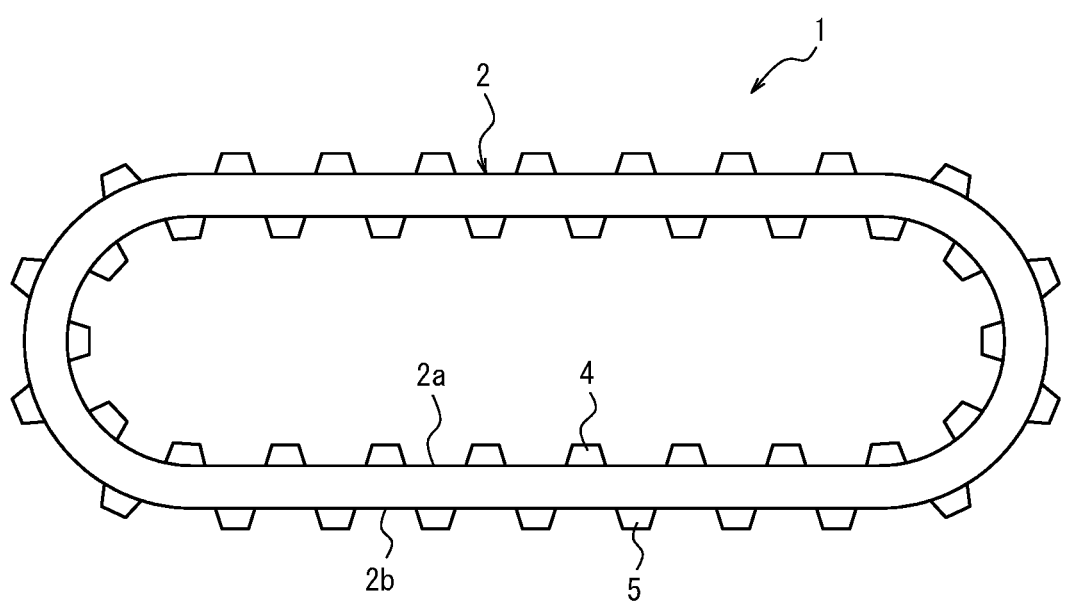
FIG. 1 illustrates a side view showing an example of a rubber crawler manufacturable with the method for producing a rubber crawler according to one embodiment of this disclosure.
Figure 2A:
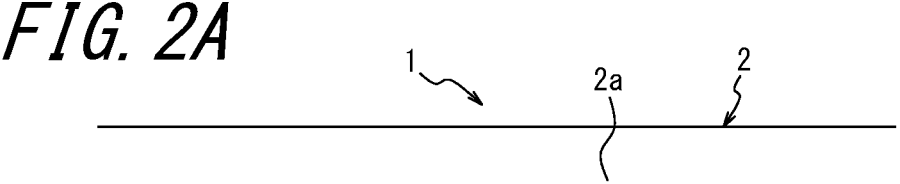
FIG. 2A illustrates a plan view of the rubber crawler of FIG. 1 seen from an inner circumferential side.
Figure 2A:
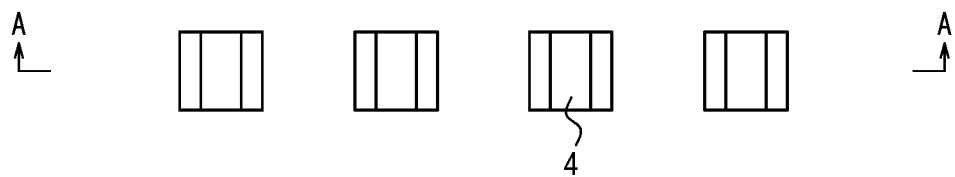
Figure 2B:
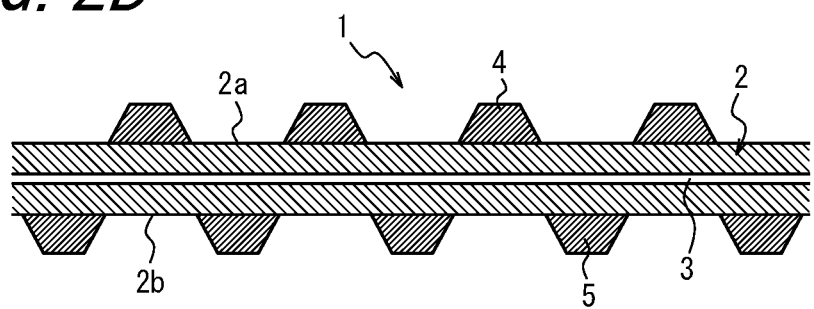
FIG. 2B illustrates an A-A cross-sectional view of FIG. 2A and FIG. 2C in the rubber crawler of FIG. 1.

In FIG. 1, the reference sign 1 is a rubber crawler manufacturable with the method for producing a rubber crawler of this disclosure. The rubber crawler 1 has an endless belt-like crawler main body (main body) 2 formed of a vulcanized rubber. As illustrated in FIG. 2B, tension members (e.g., steel cords) 3 are embedded in the crawler main body 2. The tension members 3 extend in the circumferential direction of the crawler main body 2, and are arranged in a plurality in a manner spaced from each other in the width direction of the crawler main body (a direction perpendicular to the page in FIG. 2B). Other than the tension members 3, a reinforcement layer, etc. may be embedded on the inside and outer circumferential sides of the tension members 3 in the crawler main body.

The reference sign 4 is driving protrusions (rubber protrusions) disposed on an inner circumferential surface 2a of the crawler main body 2. The driving protrusions 4 are formed of a vulcanized rubber. The driving protrusions 4 cause rotation of the rubber crawler 1 by engaging with a sprocket, which is not illustrated. In the rubber crawler 1, as illustrated in FIG. 2B, a plurality of driving protrusions 4 are arranged in a manner spaced from each other in the circumferential direction of the crawler main body 2 (the lateral direction in the drawing). The shape and arrangement of the driving protrusions 4 may be appropriately varied.

Figure 2C:
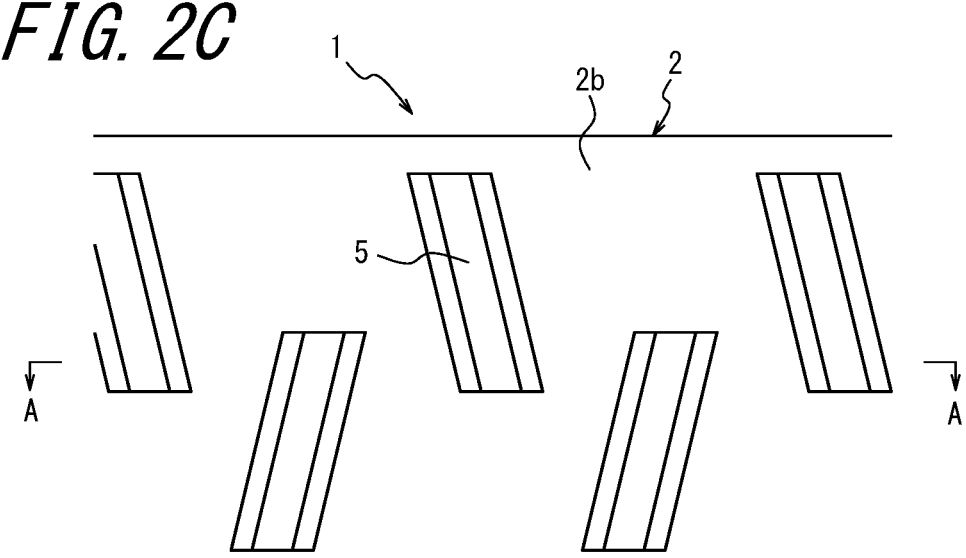
FIG. 2C illustrates a plan view of the rubber crawler of FIG. 1 seen from an outer circumferential side.

In FIG. 1, the reference sign 5 is lugs (rubber protrusions) disposed on an outer circumferential surface 2b of the crawler main body 2. The lugs 5 are formed of a vulcanized rubber. In the rubber crawler 1, as illustrated in FIG. 2C, a plurality of lugs 5 are arranged in a manner spaced from each other in the circumferential direction of the crawler main body 2. In the rubber crawler 1, the plurality of lugs 5 are arranged alternately in the circumferential direction of the crawler main body 2. The shape and arrangement of the lugs 5 may be appropriately varied.

Next, a method for manufacturing the rubber crawler 1 according to the one embodiment of this disclosure would be described. In the following, the method for manufacturing the rubber crawler 1 according to the same embodiment would be described with the vertical direction in the drawing as the up-down direction.

The method for manufacturing the rubber crawler 1 according to the present embodiment comprises forming rubber protrusions by vulcanizing an unvulcanized rubber RR while keeping a part of its surface in a half-vulcanized state, to obtain rubber protrusions (the driving protrusions 4 and the lugs 5 in the present embodiment) having a half-vulcanized surface.

Figure 3A:
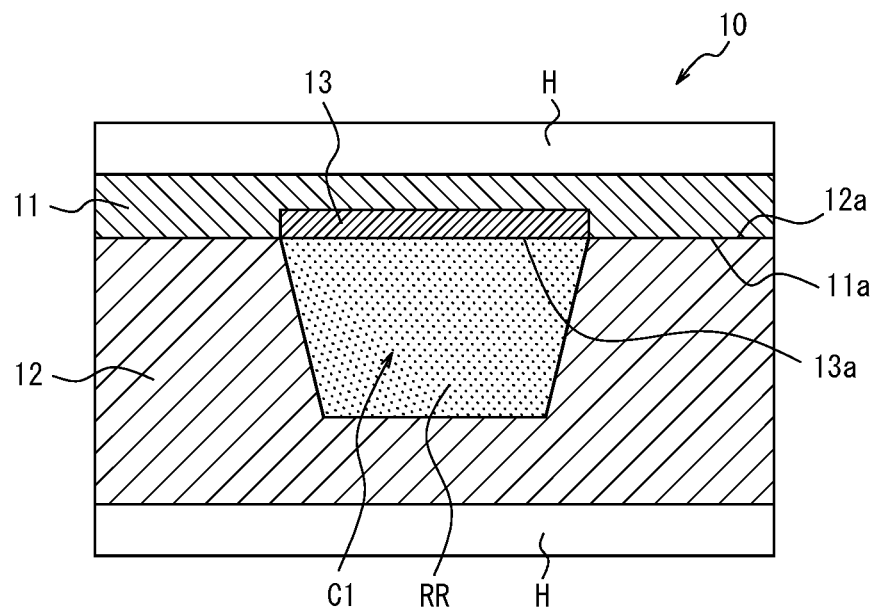
FIG. 3A illustrates a cross-sectional view showing an example of a rubber protrusion forming mold used in the forming of the rubber protrusions in the method for producing a rubber crawler according to the one embodiment of this disclosure usable in manufacture of the rubber crawler in FIG. 1.

In FIG. 3A, the reference sign 10 is an example of the rubber protrusion forming mold used in the forming of the rubber protrusions in the method for manufacturing the rubber crawler 1 according to the one embodiment of this disclosure. The rubber protrusion forming mold 10 has an upper mold piece 11 for shaping an inner side shape of the driving protrusions 4 and a lower mold piece 12 for shaping an outer side shape of the driving protrusions 4, and as illustrated, by matching a mating surface 11a of the upper mold piece 11 and a mating surface 12a of the lower mold piece 12, a cavity C1 for forming the driving protrusions 4 is formed. In the cavity C1, the unvulcanized rubber RR is arranged.

The upper mold piece 11 is formed of a metal such as iron and aluminum alloy, and a heating means H is disposed on an upper side thereof. The heating means H heats an inside of the cavity C1 from the upper side via the upper mold piece 11. The lower mold piece 12 is formed of a metal such as iron and aluminum alloy, and a heating means H is disposed on a lower side thereof. The heating means H heats the inside of the cavity C1 from the lower side via the lower mold piece 12. Thereby, the inside of the cavity C1 can be heated with the two heating means H. Examples of the heating means H include heaters utilizing vapor pressure or electricity.

The upper mold piece 11 further comprises a thermal insulation material 13 as a thermal insulation means. The thermal insulation material 13 cuts off heat from the heating means H, and thereby suppresses heating from the upper mold piece 11 to the unvulcanized rubber RR inside the cavity C. The thermal insulation material 13 is embedded in the upper mold piece 11. Preferably, as illustrated in FIG. 3A, a surface 13a of the thermal insulation material 13 is embedded so as to be in the same plane as the mating surface 11a of the upper mold piece 11. When heating with the heating means H, thermal conduction from the upper mold piece 11 to the unvulcanized rubber RR, which is in contact with the surface 13a of the thermal insulation material 13, is suppressed, and thus the part in contact with the surface 13a of the thermal insulation material 13 comes into a half-vulcanized state. Examples of the thermal insulation material include fluorine-resin-based thermal insulation materials such as polytetrafluoroethylene (PTFE) and glass-cloth-based thermal insulation materials.

Figure 5:
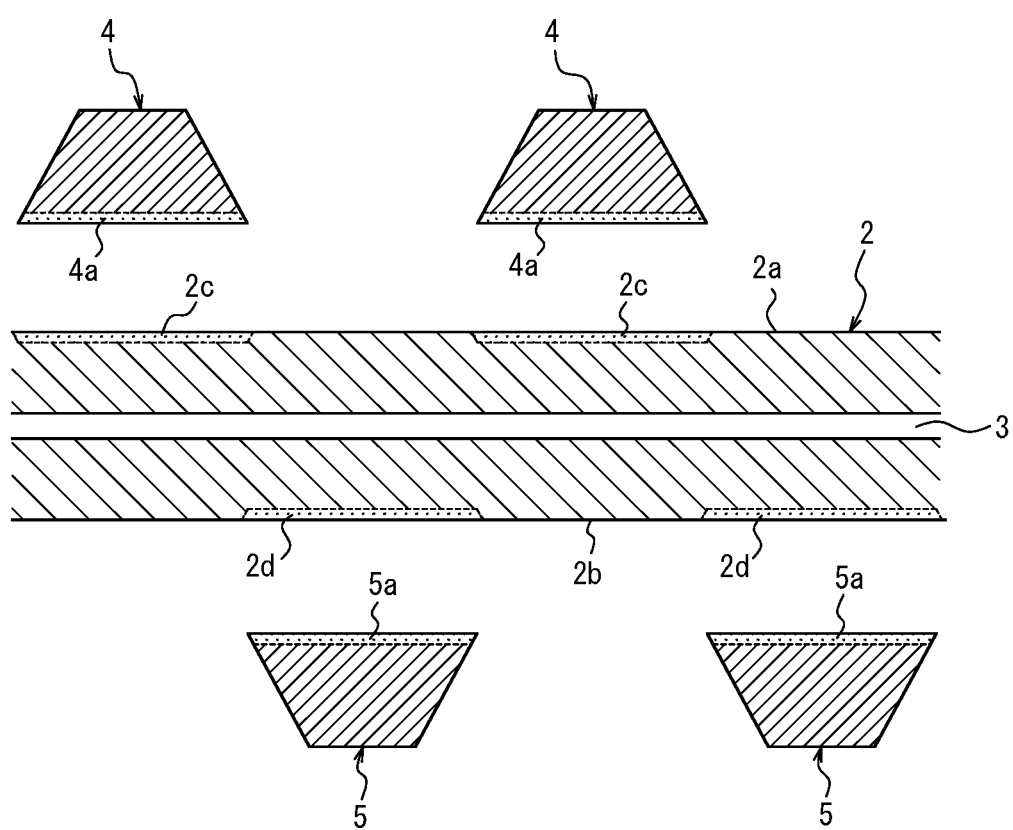
FIG. 5 illustrates a main part cross-sectional view for describing the process arranging the rubber protrusions on the crawler main body so that the half-vulcanized surface of the rubber protrusions matches the half-vulcanized surface of the main body, which is the first process of the forming of the rubber crawler in the method for producing a rubber crawler according to the one embodiment of this disclosure usable in manufacture of the rubber crawler in FIG. 1.

The driving protrusions 4 may be formed by arranging the unvulcanized rubber RR in the cavity C1 inside the rubber protrusion forming mold 10, closing the mold, and then heating the upper mold piece 11 and the lower mold piece 12 by using the heating means H. In this way, by using the rubber protrusion forming mold 10, it is possible to vulcanize the unvulcanized rubber RR inside the cavity C1 while keeping a part of the surface of the driving protrusions 4 (the contacting surface of the crawler main body 2 with the inner circumferential surface 2a in this example) in a half-vulcanized state. In other words, by using the rubber protrusion forming mold 10, it is possible to obtain the driving protrusions 4 having a half-vulcanized surface 4a as illustrated in FIG. 5. Here, the half-vulcanized state refers to a state where the vulcanization is incomplete, which leaves room for vulcanization, in other words, leaves room for vulcanization adhesion. Namely, the half-vulcanization state refers to a state in a phase before a crude rubber becomes a vulcanized rubber, and is inclusive of an unvulcanized state.

The lugs 5 may be formed with the same rubber protrusion forming mold as the rubber protrusion forming mold 10, by arranging the unvulcanized rubber RR in the cavity C1 inside the rubber protrusion forming mold, closing the mold, and heating the upper mold piece 11 and the lower mold piece 12 with the heating means H. In this way, by using the same rubber protrusion forming mold as the rubber protrusion forming mold 10, similarly as the driving protrusions 4, it is possible to vulcanize the unvulcanized rubber RR inside the cavity C1 while keeping a part of the surface of the driving lugs 5 in a half-vulcanized state. In other words, by using the same rubber protrusion forming mold as the rubber protrusion forming mold 10, it is possible to obtain the lugs 5 having a half-vulcanized surface 5a as illustrated in FIG. 5.

As mentioned above, in the forming of the rubber protrusions, rubber protrusions such as the driving protrusions 4, the lugs 5, etc. are formed by arranging the unvulcanized rubber RR in the cavity C1 inside the rubber protrusion forming mold 10, closing the mold, and heating the upper mold piece 11 and the lower mold piece 12 with the heating means H. The vulcanization of the unvulcanized rubber RR is performed by adjusting the temperature of the heating means H, e.g., between 160° C. and 180° C., and the half-vulcanized state is achieved by setting with the thermal insulation material 13 the temperature conducted from the upper mold piece 11 into the cavity C1 to, e.g., 100° C. or lower.

The method for manufacturing the rubber crawler 1 according to the present embodiment comprises forming a crawler main body by vulcanizing the unvulcanized rubber RR with the tension members 3 embedded therein while keeping at least planned arranging positions at which the rubber protrusions (the driving protrusions 4 and the lugs 5 in the present embodiment) are to be arranged in a half-vulcanized state, to obtain the crawler main body 2 having a half-vulcanized surface.

Figure 3B:
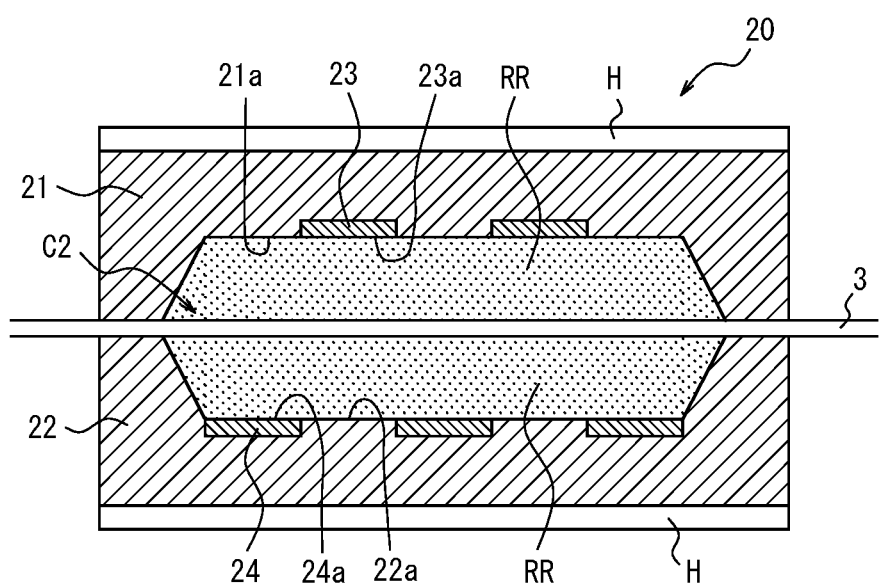
FIG. 3B illustrates a cross-sectional view showing an example of a crawler main body forming mold used in the forming of the crawler main body in the same embodiment.

In FIG. 3B, the reference sign 20 is an example of the crawler main body forming mold used in the forming of the crawler main body (the forming of the main body) in the method for manufacturing the rubber crawler 1 according to the present embodiment. In the following, the parts substantively identical to the aforementioned configuration are referred to with the same reference signs, the description thereof being omitted.

The crawler main body forming mold 20 has an upper mold piece 21 for shaping an inner circumferential side shape of the crawler main body 2 and a lower mold piece 22 for shaping an outer circumferential side shape of the crawler main body 2, and as illustrated, a cavity C2 for forming the crawler main body 2 is formed by clamping the tension members 3 with the upper mold piece 21 and the lower mold piece 22, and simultaneously matching the upper mold piece 21 and lower mold piece 22. Arranged inside the cavity C2 are the tension members 3, the unvulcanized rubber RR arranged on the inner circumferential side (the upper side in the drawing) of the tension members 3 and having a predetermined length, and the unvulcanized rubber RR arranged on the outer circumferential side (the lower side in the drawing) of the tension members 3 and having a predetermined length.

The upper mold piece 21 is formed of a metal such as iron and aluminum alloy, and the heating means H is disposed on the upper side thereof. The heating means H heats the inside of the cavity C2 from the upper side via the upper mold piece 12. The lower mold piece 22 is formed of a metal such as iron and aluminum alloy, and the heating means H is disposed on the lower side thereof. The heating means H heats an inside of the cavity C2 from the lower side via the lower mold piece 22. Thereby, the inside of the cavity C2 can be heated with the two heating means H.

The upper mold piece 21 further comprises the thermal insulation material 23 as a thermal insulation means. The thermal insulation material 23 cuts off heat from the heating means H, and thereby suppresses heating from the upper mold piece 21 to the unvulcanized rubber RR inside the cavity C2. The thermal insulation material 23 is arranged at least at the planned arranging positions at which the driving protrusions 4 are to be arranged. The thermal insulation material 23 is embedded in the upper mold piece 21. Preferably, as illustrated in FIG. 3B, the thermal insulation material 23 is embedded in a manner such that the surface 23a of the thermal insulation material 23 is in the same plane as a crawler main body inner circumferential side forming surface 21a for shaping the inner circumferential surface 2a of the crawler main body 2 in the upper mold piece 21. In the case of heating with the heating means H, the thermal conduction from the upper mold piece 21 to the unvulcanized rubber RR is suppressed at the positions in contact with the surface 23a of the thermal insulation material 23, and thus the inner circumferential surface 2a of the crawler main body 2 comes into a half-vulcanized state locally in the part in contact with the surface 23a of the thermal insulation material 23. Similarly as the thermal material 13, examples of the thermal material include fluorine-resin-based thermal insulation materials and glass-cloth-based thermal insulation materials.

The lower mold piece 22 further comprises a thermal insulation material 24 as a thermal insulation means. The thermal insulation material 24 cuts off heat from the heating means H, and thereby suppresses heating from the lower mold piece 22 to the unvulcanized rubber RR inside the cavity C2. The thermal insulation material 24 is arranged at least at the planned arranging positions at which the lugs 5 are to be arranged. The thermal insulation material 24 is embedded in the lower mold piece 22. Preferably, as illustrated in FIG. 3B, the thermal insulation material 24 is embedded in a manner such that the surface 24a of the thermal insulation material 24 is in the same plane as a crawler main body outer circumferential side forming surface 22a for shaping the outer circumferential surface 2b of the crawler main body 2 in the lower mold piece 22. In the case of heating with the heating means H, the thermal conduction from the lower mold piece 22 to the unvulcanized rubber RR is suppressed at the positions in contact with the surface 24a of the thermal insulation material 24, and thus the outer circumferential surface 2b of the crawler main body 2 comes into a half-vulcanized state locally in the part in contact with the surface 24a of the thermal insulation material 24. Similarly as the thermal materials 13, 23, examples of the thermal material 24 include fluorine-resin-based thermal insulation materials and glass-cloth-based thermal insulation materials.

The belt-like crawler main body 2 may be formed by arranging the unvulcanized rubber RR with the tension members 3 embedded therein in the cavity C2 inside the crawler main body forming mold 20, closing the mold, and heating the upper mold piece 21 and the lower mold piece 22 with the heating means H. In this way, by using the crawler main body forming mold 20, it is possible to vulcanize the unvulcanized rubber RR inside the cavity C2 while keeping the planned arranging positions at which the driving protrusions 4 and the lugs 5 are to be arranged in a half-vulcanized state. In other words, by using the crawler main body forming mold 20, as illustrated in FIG. 5, it is possible to obtain the belt-like crawler main body 2 having half-vulcanized surfaces 2c, 2d respectively locally on the inner circumferential surface 2a and the outer circumferential surface 2b. Further, by endlessly connecting at least one belt-like crawler main body 2 formed with the crawler main body forming mold 20, it is possible to form the cyclic crawler main body 2.

As mentioned above, in the forming of the crawler main body in the method for producing a rubber crawler according to the present embodiment, first, by arranging the unvulcanized rubber RR with the tension members 3 embedded therein in the cavity C2 inside the crawler main body forming mold 20, closing the mold, and heating the upper mold piece 21 and the lower mold piece 22 by using the heating means H, at least one belt-like crawler main body 2 is formed. The vulcanization of the unvulcanized rubber RR is performed by adjusting the temperature of the heating means H, e.g., between 160° C. and 180° C., and the half-vulcanized state is achieved by setting with the thermal insulation materials 23, 24 the temperature conducted from the upper mold piece 21 and the lower mold piece 22 into the cavity C2 to, e.g., 70° C. to 80° C.

Next, by endlessly connecting at least one belt-like crawler main body 2 formed in the forming of the crawler main body here, the crawler main body forming mold 20, the desired cyclic crawler main body 2 is formed. Note that the cyclic crawler main body 2 may be formed with only the crawler main body forming mold, by using a circular crawler main body forming mold with an endless cavity C2 as the crawler main body forming mold 20. Namely, similarly as the forming of the rubber protrusions, the forming of the crawler main body may be performed by using only the crawler main body forming mold.

Figure 4A:
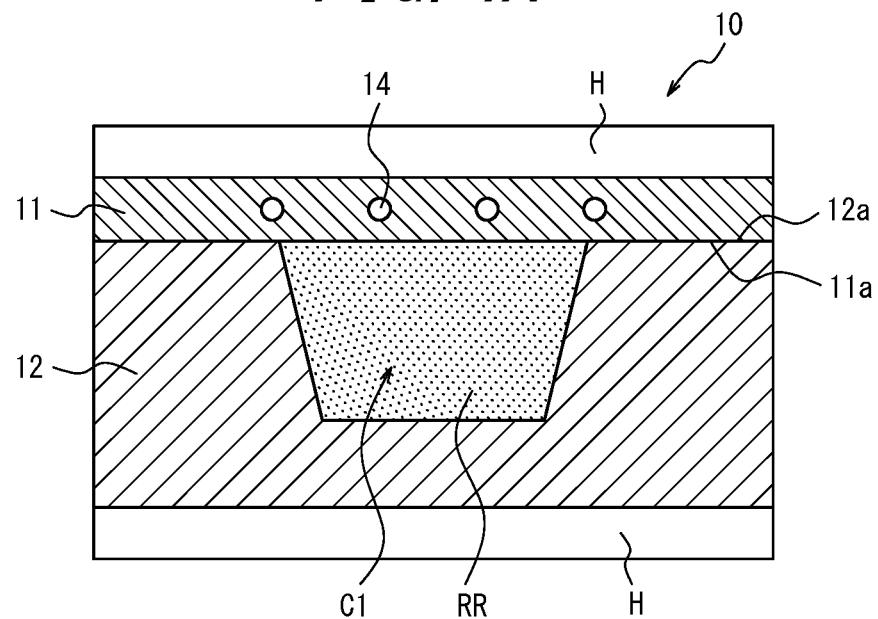
FIG. 4A illustrates a cross-sectional view showing another example of the rubber protrusion forming mold used in the forming of the rubber protrusions in the method for producing the rubber crawler according to the one embodiment of this disclosure usable in manufacture of the rubber crawler in FIG. 1.

Moreover, as the method for producing a rubber crawler according to the present embodiment capable of manufacturing the rubber crawler in FIG. 1, positive thermal insulation may be performed in the forming of the rubber protrusions. FIG. 4A illustrates another example of the rubber protrusion forming mold 10 used in the forming of the rubber protrusions in the method for manufacturing the rubber crawler 1 according to the one embodiment of this disclosure. The rubber protrusion forming mold 10 in FIG. 4A utilizes a condenser 14 instead of the thermal insulation material 13 as the thermal insulation means. The condenser 14 is capable of locally cooling the upper mold piece 11 by rendering a liquid such as water pass through. The condenser 14 is embedded in the upper mold piece 11. If possible, it is preferably arranged at a position close to the mating surface 11a of the upper mold piece 11, which is a region inclusive of the cavity C1. In this case, it is possible to vulcanize the unvulcanized rubber RR inside the cavity C1 while keeping a part of the surfaces of the driving protrusions 4 and the lugs 5 in a half-vulcanized state. In other words, by positively cutting off the heat from the heating means H by cooling the upper mold piece 11, as illustrated in FIG. 5, it is possible to obtain the driving protrusions 4 having the half-vulcanized surface 4a and the lugs 5 having the half-vulcanized surface 5a. Note that the number of the condenser 14 is 4 in FIG. 4A, while the number of the condenser 14 may be any one in accordance with the number of the driving protrusions 4.

Figure 4B:
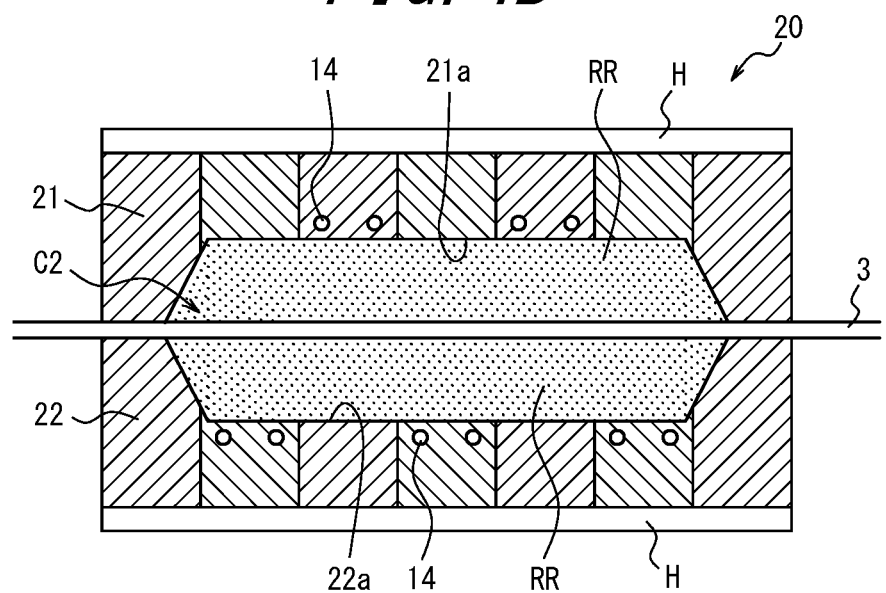
FIG. 4B illustrates a cross-sectional view showing another example of the crawler main body forming mold used in the forming of the crawler main body in the same embodiment.

Similarly, FIG. 4B illustrates another example of the crawler main body forming mold 20 used in the forming of the crawler main body in the method for manufacturing the rubber crawler 1 according to the one embodiment of this disclosure. The crawler main body forming mold 20 in FIG. 4B utilizes a condenser 14 instead of the thermal insulation material 13 as the thermal insulation means. The condenser 14 is embedded in the upper mold piece 21 and the lower mold piece 22. In this case, it is possible to vulcanize the unvulcanized rubber RR inside the cavity C2 while keeping the planned arranging positions at which the driving protrusions 4 and the lugs 5 are to be arranged in a half-vulcanized state. In other words, by positively cutting off the heat from the heating means H by cooling the upper mold piece 21 and the lower mold piece 22, as illustrated in FIG. 5, it is possible to obtain the belt-like or cyclic crawler main body 2 having the half-vulcanized surfaces 2c, 2d. Note that the number of the condenser 14 is 6 in FIG. 4B, while the number of the condenser 14 may be any one in accordance with the number of the lugs 5.

The rubber crawler 1 according to the present embodiment further comprises forming a rubber crawler by arranging the rubber protrusions on the main body so that the half-vulcanized surface of the rubber protrusions (the half-vulcanized surface 4a of the driving protrusions 4 and the half-vulcanized surface 5a of the lugs 5) matches the half-vulcanized surface of the main body (the half-vulcanized surface 2c and the half-vulcanized surface 2d in the present embodiment), and then integrating the rubber protrusions and the crawler main body 2 via vulcanization.

After obtaining the driving protrusions 4 having the half-vulcanized surface 4a, the lugs 5 having the half-vulcanized surface 5a and the crawler main body 2 having the half-vulcanized surfaces 2c, 2d via the forming of the rubber protrusions and the forming of the crawler main body, i.e., after completing the forming of the rubber protrusions and the forming of the crawler main body, the forming of the rubber crawler is performed following these processes.

The forming of the rubber crawler in the present embodiment includes two processes. As a first process, as illustrated in FIG. 5, the half-vulcanized surface 4a of the driving protrusions 4 and the half-vulcanized surface 5a of the lugs 5 are respectively arranged on the half-vulcanized surfaces 2c, 2d of the crawler main body 2, and the rubber crawler 1 in a half-vulcanized state is temporarily assembled.

Next, as a second process, by respectively vulcanizing the temporarily assembled half-vulcanized surface 4a of the driving protrusions 4 with the half-vulcanized surface 2c of the crawler main body 2 and the half-vulcanized surface 5a of the lugs 5 with the half-vulcanized surface 2d of the crawler main body 2, the driving protrusions 4 and the lugs 5 are integrated with the crawler main body 2 via vulcanization adhesion.

Figure 6A:
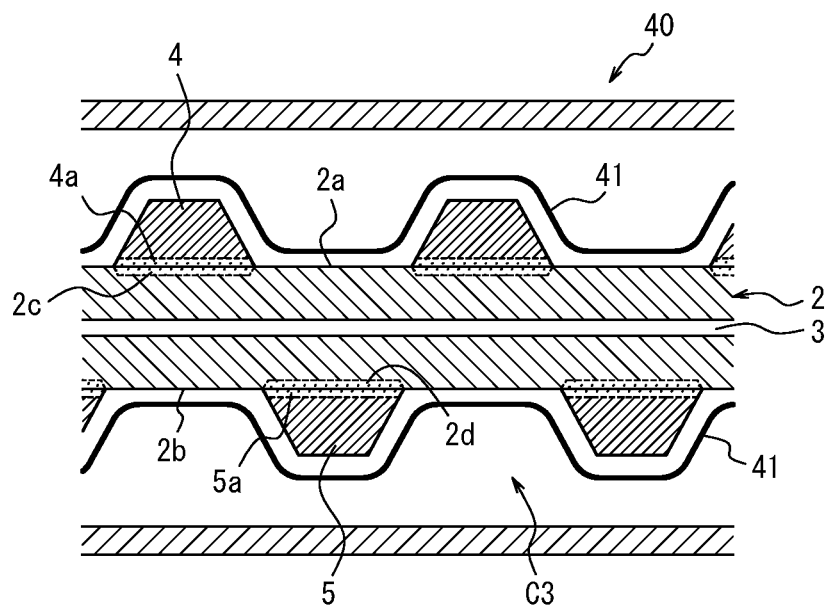
FIG. 6A illustrates a main part cross-sectional view for describing a process vulcanizing the half-vulcanized surface of the rubber protrusions and the crawler main body by using a vulcanizer, which is an example of the second process of the forming of the rubber crawler in the method for producing a rubber crawler according to the one embodiment of this disclosure usable in manufacture of the rubber crawler in FIG. 1.

FIG. 6A illustrates a main part cross-sectional view for describing a process vulcanizing the half-vulcanized surface 5a of the elastic protrusions 4 with the half-vulcanized surface 2c of the crawler main body 2 and the half-vulcanized surface 5a of the lugs 5 with the half-vulcanized surface 2d of the crawler main body 2 by using a vulcanizer 40, which is an example of the second process of the forming of the rubber crawler in the method for producing a rubber crawler according to the one embodiment of this disclosure usable in manufacture of the rubber crawler in FIG. 1.

The vulcanizer 40 is an apparatus for vulcanizing an unvulcanized rubber having a sealed space (space) C3 controllable at high temperature (a temperature higher than ordinary, preferably 130° C. or higher) and high pressure (a pressure higher than ordinary, preferably 5 MPa or higher). For example, vapor heating may be used for heating. Note that upper limits of the temperature and the pressure inside the sealed space C3 may be appropriately set within a range without affecting the performances of the rubber crawler 1 after vulcanization molding.

In the case of using the vulcanizer 40, after arranging the driving protrusions 4 and the lugs 5 on the crawler main body 2 and temporarily assembling them as the rubber crawler 1 in a half-vulcanized state, this temporarily assembled rubber crawler 1 in a half-vulcanized state is put into an envelope 41, and is fixed inside the envelope 41 via decompression. Then, the fixed temporarily assembled rubber crawler 1 is put into the sealed space C3 of the vulcanizer 40 to be vulcanized. Inside the vulcanizer 40, the driving protrusions 4 and the crawler main body 2 may be integrated due to vulcanization adhesion of the temporarily assembled half-vulcanized surface 4a of the driving protrusions 4 and the half-vulcanized surface 2c of the crawler main body 2, and the lugs 5 and the crawler main body 2 may be integrated due to vulcanization adhesion of the temporarily assembled half-vulcanized surface 5 of the lugs 5 and the half-vulcanized surface 2d of the crawler main body 2. Thereby, vulcanization molding of the rubber crawler 1 having the driving protrusions 4 and the lugs 5 is completed. Vulcanization of the half-vulcanized surface 4a of the driving protrusions 4 with the half-vulcanized surface 2c of the crawler main body 2 and the half-vulcanized surface 5a of the lugs 5 with the half-vulcanized surface 2d of the crawler main body 2 is achieved by adjusting the temperature of the heating means, e.g., between 160° C. and 180° C., and, for example, performing pressure heating for around 2 hours.

As another example of the second process of the forming of the rubber crawler in the method for producing a rubber crawler of this disclosure usable in manufacture of the rubber crawler in FIG. 1, a rubber crawler forming mold 50 may be used to perform the molding.

Figure 6B:
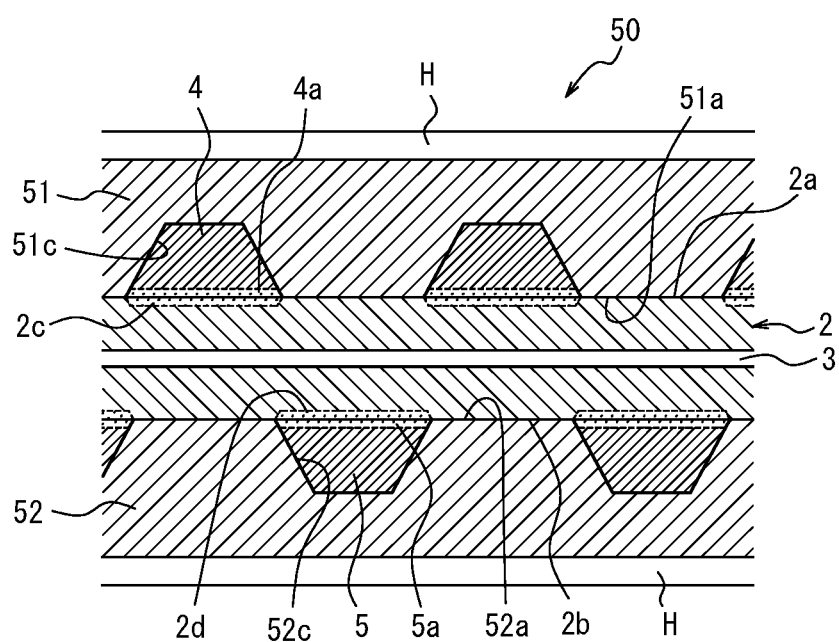
FIG. 6B illustrates a main part cross-sectional view for describing a process vulcanizing the half-vulcanized surface of the rubber protrusions and the crawler main body with the rubber crawler forming mold, which is another example of the second process of the forming of the rubber crawler in the method for producing a rubber crawler according to the one embodiment of this disclosure usable in manufacture of the rubber crawler in FIG. 1.

In FIG. 6B, the rubber crawler forming mold 50 has an upper mold piece 51 for shaping the inner circumferential surface side shape of the rubber crawler 1 and a lower mold piece 52 for shaping the outer circumferential surface side shape of the rubber crawler 1. Note that in the following description, the parts substantively identical to the aforementioned configuration are referred to with the same reference signs, the description thereof being omitted.

On a mating surface 51a of the upper mold piece 51, as illustrated, recesses 51c for arranging the driving protrusions 4 in a half-vulcanized state formed in the forming of the rubber protrusions are disposed. Similarly, on a mating surface 52a of the lower mold piece 52, as illustrated, recesses 52c for arranging the lugs 5 in a half-vulcanized state formed in the forming of the rubber protrusions are disposed. Further, the rubber crawler forming mold 50 is capable of arranging the crawler main body 2 in a half-vulcanized state formed in the forming of the crawler main body between the upper mold piece 51 and the lower mold piece 52.

The upper mold piece 51 is formed of a metal such as iron and aluminum alloy, and the heating means H is disposed on the upper side thereof.

The heating means H vulcanizes the half-vulcanized surface 4a of the driving protrusions 4 and the half-vulcanized surface 2c of the crawler main body 2 from the upper mold piece 51. The lower mold piece 52 is formed of a metal such as iron and aluminum alloy, and the heating means H is disposed on the lower side thereof. The heating means H vulcanizes the half-vulcanized surface 5a of the lugs 4 and the half-vulcanized surface 2d of the crawler main body 2 from the lower mold piece 52. Thereby, it is possible to perform vulcanization adhesion of the driving protrusions 4 and the lugs 5 to the crawler main body 2 integrally.

In this example, the first process temporarily assembling the half-vulcanized surface 4a of the driving protrusions 4 and the half-vulcanized surface 5a of the lugs 5 with the half-vulcanized surfaces 2c, 2d of the crawler main body 2 is performed by arranging the driving protrusions 4 in a half-vulcanized state formed in the forming of the rubber protrusions in the recesses 51c formed on the upper mold piece 51, arranging the lugs 5 in a half-vulcanized state formed similarly in the forming of the rubber protrusions in the recesses 52c formed on the lower mold piece 52, and then arranging the crawler main body 2 in a half-vulcanized state formed in the forming of the crawler main body between the upper mold piece 51 and the lower mold piece 52, and closing the mold.

Next, the second process integrally vulcanizing the driving protrusions 4 and the lugs 5 with the crawler main body 2 is performed by subjecting to vulcanization adhesion with the heating means H the half-vulcanized surface 4a of the driving protrusions 4 with the half-vulcanized surface 2c of the crawler main body 2 and the half-vulcanized surface 5a of the lugs 5 with the half-vulcanized surface 2d of the crawler main body 2, which are enclosed in the mold between the upper mold piece 51 and the lower mold piece 52. In this way, in the forming of the rubber crawler, by using the rubber crawler forming mold 50, the first process and the second process may be performed as a continuous operation.

According to the aforementioned method for manufacturing the rubber crawler 1 according to the present embodiment, as illustrated in FIG. 3B and FIG. 4B, the crawler main body 2 is molded independently from the driving protrusions 4 and the lugs 5. In this case, on the upper mold piece 21 and the lower mold piece 22 of the crawler main body forming mold 20, the recesses for shaping the driving protrusions 4 and the lugs 5, i.e., the part in which the unvulcanized rubber RR arranged inside the cavity C2 flows greatly, do not exist. Therefore, by pressing the tension members 3 to the unvulcanized rubber RR, it is possible to suppress deformation occurring to the tension members 3. Therefore, according to the aforementioned method for manufacturing the rubber crawler 1, it is possible to provide a method for producing a rubber crawler capable of suppressing deformation which probably occurs to the tension members 3 during manufacture.

In addition, according to the method for manufacturing the rubber crawler 1, by subjecting the driving protrusions 4 to vulcanization molding such that a part of the surface of the driving protrusions 4 becomes the half-vulcanized surface 4a and subjecting the lugs 5 to vulcanization molding such that a part of the surface of the lugs 5 becomes the half-vulcanized surface 5a as illustrated in FIG. 3A and FIG. 4A, and integrating the same by vulcanizing them on the half-vulcanized surfaces 2c, 2d of the crawler main body 2 as illustrated in FIGS. 6A and 6B, an adhesive rubber necessary for adhering vulcanized rubbers becomes unnecessary. Moreover, since application of an adhesion means such as an adhesive rubber becomes unnecessary, the operability thereof becomes excellent. Moreover, by subjecting the half-vulcanized surfaces to vulcanization molding, the adhesion strength is improved as compared to products using an adhesion rubber.

In particular, in a method for manufacturing the rubber crawler 1 using the vulcanizer 40 as illustrated in FIG. 6A, in the forming of the rubber crawler, the half-vulcanized surface 4a of the driving protrusions 4 with the half-vulcanized surface 2c of the crawler main body 2 and the half-vulcanized surface 5a of the lugs 5 and the half-vulcanized surface 2d of the crawler main body 2 are vulcanized inside the sealed space C3 controllable at high temperature and high pressure. In this case, a mold for integrating the driving protrusions 4 and the lugs 5 with the crawler main body 2 such as the rubber crawler forming mold 50 as illustrated in FIG. 6B is unnecessary. Moreover, by vulcanizing a plurality of rubber crawlers 1 in a half-vulcanized state at one time with the vulcanizer 40, it is possible to improve the productivity (the production per unit time), and to reduce the production cost.

The case described above is only one embodiment of this disclosure, and a variety of modifications may be made within the scope of the appended claims. For example, the thermal insulation means used in the forming of the rubber protrusions and the forming of the crawler main body is exemplified with a thermal insulation material and a condenser, but may also be any one capable of exhibiting thermal insulation performance while keeping a part of the surface of the rubber protrusions in a half-vulcanized state. Specific examples include one having a space disposed in the upper mold piece and the lower mold piece of the crawler main body forming mold, and using the space as a thermal insulation layer. If the space is further evacuated (inclusive of a state decompressed than atmospheric pressure), the thermal insulation effect can be improved. Moreover, in the crawler main body forming mold 20, the thermal insulation means is disposed locally with respect to the planned arranging positions at which the driving protrusions 4 and the lugs 5 are to be arranged, but may be embedded in the entire crawler main body inner circumferential side forming surface 21a of the upper mold piece 21 and the entire crawler main body outer circumferential side forming surface 22a of the lower mold piece 22 (preferably positions closer to the inner circumferential side forming surface 21a and the outer circumferential side forming surface 22a of the crawler main body). Moreover, in the crawler main body forming mold 20, by dividing the upper mold piece 21 and the lower mold piece 22 into a plurality, the arrangement of the thermal insulation means can be appropriately changed, while the upper mold piece 21 and the lower mold piece 22 may be configured integrally as well. Further, the rubber protrusion forming mold 10, the crawler main body forming mold 20 and the rubber crawler forming mold 50 may have a reversed configuration of the upper mold piece and the lower mold piece.

INDUSTRIAL APPLICABILITY

This disclosure may be used to a method for producing a rubber crawler in which the rubber protrusions are disposed separately from the main body.

REFERENCE SIGNS LIST 1 rubber crawler
2 crawler main body (main body)
2a inner circumferential surface of crawler main body
2b outer circumferential surface of crawler main body
2c half-vulcanized surface
2d half-vulcanized surface
3 tension member
4 driving protrusion (rubber protrusion)
4a half-vulcanized surface
5 lug (rubber protrusion)
5a half-vulcanized surface
10 rubber protrusion forming mold
11 upper mold piece
11a mating surface of upper mold piece
12 lower mold piece
12a mating surface of lower mold piece
13 thermal insulation material
13a surface of thermal insulation material
14 condenser
20 crawler main body forming mold
21 upper mold piece
21a crawler main body inner circumferential side forming surface
22 lower mold piece
22a crawler main body outer circumferential side forming surface
23 thermal insulation material
23a surface of thermal insulation material
24 thermal insulation material
24a surface of thermal insulation material
40 vulcanizer
41 heat resistant sheet
50 rubber crawler forming mold
51 upper mold piece
51a mating surface on upper side
51c recess
52 lower mold piece
52a mating surface on lower side
52c recess
C1 cavity
C2 cavity
C3 sealed space (space)
H heating means
RR unvulcanized rubber

The invention claimed is:

1. A method for producing a rubber crawler comprising:
forming rubber protrusions having a half-vulcanized surface by vulcanizing a first unvulcanized rubber while suppressing thermal conduction to the first unvulcanized rubber to keep a part of its surface in a half-vulcanized state;
forming a main body having a half-vulcanized surface by vulcanizing a second unvulcanized rubber with tension members embedded therein while suppressing thermal conduction to the second unvulcanized rubber to keep only first portions including planned arranging positions at which the rubber protrusions are to be arranged in a half-vulcanized state, the first portions being distanced from the tension members in a thickness direction of the main body; and
forming a rubber crawler by, after the forming of the rubber protrusions and the forming of the main body, arranging the rubber protrusions on the main body so that the half-vulcanized surface of the rubber protrusions matches the half-vulcanized surface of the main body, and then integrating the rubber protrusions and the main body via vulcanization, wherein
the rubber protrusions are formed in a first mold comprising a first thermal insulation material arranged at least at a surface of the first mold defining the half-vulcanized surface, and wherein
the first mold has an upper mold piece and a lower mold piece,
the upper mold has a first mating surface and the lower mold has a second mating surface matching with the first mating surface, and
the first thermal insulation material is embedded in the upper mold piece so as to be flush with the first mating surface.

2. The method for producing a rubber crawler according to claim 1, wherein:
in the forming of the rubber crawler, the rubber protrusions and the main body are vulcanized in a space controllable at high temperature and high pressure.

3. The method for producing a rubber crawler according to claim 1, wherein:
the main body is formed in a second mold comprising a second thermal insulation material arranged at least at the planned arranging positions.

4. The method for producing a rubber crawler according to claim 3, wherein:
the second mold has an upper mold piece and a lower mold piece,
the second thermal insulation material is embedded in both of the upper and lower mold pieces.

5. The method for producing a rubber crawler according to claim 1, wherein
in forming the rubber protrusions, the first unvulcanized rubber is vulcanized while suppressing thermal conduction to the first unvulcanized rubber to keep only a second portion including its surface in a half-vulcanized state.

6. A method for producing a rubber crawler comprising:
forming rubber protrusions having a half-vulcanized surface by vulcanizing a first unvulcanized rubber while suppressing thermal conduction to the first unvulcanized rubber to keep a part of its surface in a half-vulcanized state;
forming a main body having a half-vulcanized surface by vulcanizing a second unvulcanized rubber with tension members embedded therein while suppressing thermal conduction to the second unvulcanized rubber to keep only first portions including planned arranging positions at which the rubber protrusions are to be arranged in a half-vulcanized state, the first portions being distanced from the tension members in a thickness direction of the main body; and
forming a rubber crawler by, after the forming of the rubber protrusions and the forming of the main body, arranging the rubber protrusions on the main body so that the half-vulcanized surface of the rubber protrusions matches the half-vulcanized surface of the main body, and then integrating the rubber protrusions and the main body via vulcanization, wherein:
the main body is formed in a second mold comprising a second thermal insulation material arranged at least at the planned arranging positions,
the second mold has an upper mold piece and a lower mold piece, and
the second thermal insulation material is embedded in both of the upper and lower mold pieces.

* * * * *